US007985367B2

(12) United States Patent
Hiromatsu et al.

(10) Patent No.: US 7,985,367 B2
(45) Date of Patent: Jul. 26, 2011

(54) METHOD FOR PRODUCING ACTIVE GLASS NANOPARTICLES BY LASER ABLATION

(75) Inventors: Kuniaki Hiromatsu, Tokyo (JP); David Jen Hwang, Albany, CA (US); Costas P. Grigoropoulos, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 76 days.

(21) Appl. No.: 12/512,991

(22) Filed: Jul. 31, 2009

(65) Prior Publication Data
US 2010/0072645 A1 Mar. 25, 2010

Related U.S. Application Data

(63) Continuation of application No. PCT/US2008/052846, filed on Feb. 1, 2008.

(60) Provisional application No. 60/887,872, filed on Feb. 2, 2007, provisional application No. 60/888,688, filed on Feb. 7, 2007.

(51) Int. Cl.
*B29C 35/08* (2006.01)

(52) U.S. Cl. ............................ 264/400; 264/21; 977/889

(58) Field of Classification Search .................. 264/400, 264/21; 977/889
See application file for complete search history.

(56) References Cited

U.S. PATENT DOCUMENTS

| 5,242,706 | A | * | 9/1993 | Cotell et al. ................. 427/2.27 |
| 5,648,181 | A | | 7/1997 | Watanabe |
| 2001/0009250 | A1 | | 7/2001 | Herman et al. |
| 2003/0134424 | A1 | | 7/2003 | Canham et al. |
| 2004/0003627 | A1 | * | 1/2004 | Hashima et al. ............... 65/33.2 |
| 2004/0171076 | A1 | | 9/2004 | Dejneka et al. |
| 2005/0258149 | A1 | | 11/2005 | Glukhoy et al. |
| 2006/0049741 | A1 | * | 3/2006 | Bouchard et al. ............. 313/495 |
| 2006/0051522 | A1 | * | 3/2006 | Talton .......................... 427/596 |

OTHER PUBLICATIONS

"Excimer Pulsed laser ablation of polymers in air and liquids for micromachining applications" (Chang) Dated 1999.*

* cited by examiner

*Primary Examiner* — Robert B Davis
*Assistant Examiner* — David N Brown, II
(74) *Attorney, Agent, or Firm* — John P. O'Banion

(57) ABSTRACT

A method for producing active glass nanoparticles that exhibit upconversion is described. The method employs pulsed-laser ablation of an active glass substrate using, for example, a high repetition rate ultra-short pulse duration laser under normal atmospheric conditions or in a liquid environment.

30 Claims, 9 Drawing Sheets

US 7,985,367 B2

METHOD FOR PRODUCING ACTIVE GLASS NANOPARTICLES BY LASER ABLATION

CROSS-REFERENCE TO RELATED APPLICATIONS

This application claims priority from, and is a 35 U.S.C. §111(a) continuation of, co-pending PCT international application serial number PCT/US2008/052846 filed on Feb. 1, 2008, incorporated herein by reference in its entirety, which claims priority from U.S. provisional application No. 60/887,872, filed on Feb. 2, 2007, incorporated herein by reference in its entirety, and from U.S. provisional application Ser. No. 60/888,688, filed on Feb. 7, 2007, incorporated herein by reference in its entirety.

This application is also related to PCT International Publication No. WO 2008/118,536 which was published on Oct. 2, 2008 and republished on Dec. 11, 2008, each of which is incorporated herein by reference in its entirety.

STATEMENT REGARDING FEDERALLY SPONSORED RESEARCH OR DEVELOPMENT

This invention was made with Government support under Grant No. DMI-0556363, awarded by the National Science Foundation. The Government has certain rights in this invention.

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to methods of manufacturing nanoparticles, and more particularly to a method for producing active glass nanoparticles by ablating a glass substrate material with pulsed laser radiation.

2. Description of Related Art

Nanoparticles based on semiconductors and metals have been extensively studied in recent years due to their novel properties, which may be greatly different from those of their bulk counterparts. In particular, quantum dots (QDs) are very attractive for research in biotechnology applications, such as biological reagents and cellular imaging. Recently, the domain of interest is expanding to light-emitting diodes (LEDs), lasers, and telecommunication devices. The usefulness of QDs comes from their small size, ranging from 2-10 nanometers, and also the photoluminescence properties. For biological assays and imaging, organic dyes have also been used.

The majority of current commercialized organic dyes and QDs absorb UV, blue, or green excitation light, and then re-emit light at a longer wavelength. However, many biological species fluoresce under ultraviolet or visible radiation, leading to difficulty in choosing appropriate labels and optical filters. To avoid these difficulties, near-infrared (NIR) light, which is only weakly absorbed by biological tissue is often used for excitation of these biolabels via two-photon absorption processes. Due to the low efficiency of two-photon absorption, this requires high excitation densities. Of course, too much irradiated energy may cause thermal decomposition. This is precisely the reason for frequently using expensive femto- or picosecond pulsed lasers as light sources to minimize thermal affects.

An alternative route for generating visible emission by NIR excitation is via photon upconversion. Upconversion is a process where higher photon energy light, usually ultraviolet (UV) or visible, can be emitted with lower energy light, near infrared (NIR) or infrared (IR), via excitation mechanisms that involve more than one absorbed photon per emitted photon. The efficiency is much higher than two-photon absorption processes; therefore continuous wave (CW) laser or even lamp excitation is possible. For these reasons, upconverting nanocrystals (NCs) has gathered considerable attention recently. Upconverting $NaYF_4$ NCs doped with $Er_{3+}/Yb_{3+}$ have already been applied successfully to analyte, DNA detection and bioimaging. These results show great potential for upconverting NCs. However, base materials for NCs are limited since these are mostly produced by synthetic methods such as thermal decomposition in a high-boiling-point solvent. Consequently, it is not a minor issue to apply this technique to many other materials, leading to difficulties in achieving high upconversion efficiency.

Most efficient and stable upconversion materials can be found in upconversion laser systems. Nowadays, most upconversion lasers are based on glass fibers. Specific examples are Thulium-doped blue lasers, pumped around 1120 nm and emitting around 480 nm, Erbium (Er)-doped green lasers, pumped around 980 nm and lasing around 550 nm, and Praseodymium/Ytterbium-doped lasers, pumped at around 850 nm (using an avalanche process) and emitting at one of various visible wavelengths in the red (635 nm), orange (605 nm), green (520 nm), or blue (491 nm) spectral region. Especially Er-doped glass fibers have been developed not only for upconversion lasers but also optical amplifiers and broadband light sources operation in the 1.5 µm telecommunication band. In recent studies, $Bi_2O_3$-based Er-doped fibers are well known to have high potential for optical amplifiers and also the strong green emission due to upconversion has been observed from these materials.

In this study, we have investigated the capability of nanoparticle generation by laser ablation of $Bi_2O_3$ based Er-doped glass material. Laser ablation is widely used to produce various species of metal and metal oxide nanoparticles; however, researches on glass particle generations are very limited. Here, we present a method to produce active glass nanoparticles by high repetition rate femtosecond laser ablation.

BRIEF SUMMARY OF THE INVENTION

The present invention generally comprises a method for producing active glass nanoparticles that exhibit upconversion, by means of pulsed-laser ablation of an active glass substrate. In a first specific embodiment, a high repetition-rate, ultra-short pulse duration laser has been used to successfully produce active glass nanoparticles with the desired properties. Glass substrates were ablated by the laser under normal atmospheric conditions or in a liquid environment. Ejected particles were collected on silicon and glass substrates and analyzed to determine the particle size and characterize the morphology. Measured mean particle diameter was approximately 17 nm in one or two dimensional chain structures. Bright upconversion green emission was observed from nanoparticles. The upconversion photoluminescence characteristics have been investigated to explore their potential applications to highly efficient bio imaging and light emitting devices. This capability exceeds any currently available technology.

Accordingly, an aspect of the invention is a method for producing active glass nanoparticles by subjecting an active glass substrate material to a plurality of laser generated light pulses and collecting nanoparticles ejected from said substrate material. Another aspect of the invention is ablation of the substrate material with the said laser. A further aspect of the invention is that the nanoparticles exhibit upconversion luminescence.

In one embodiment, the laser is a high repetition-rate, ultra-short wavelength, pulsed-laser. The laser may be focused either loosely to a single spot or tightly to multiple spots for yield increase. In one embodiment, the substrate material is in a liquid environment. In another embodiment the substrate material is in a in a gaseous environment, such as a normal atmospheric environment.

In one embodiment, the substrate material comprises an Erbium-doped material. In another embodiment, the substrate material comprises an Erbium-doped Bismuth Oxide material. In a further embodiment, the substrate material comprises $Bi_2O_3$ based Er-doped glass material.

In one embodiment, the nanoparticles are collected on a silicon substrate. In another embodiment, the nanoparticles are collected on a glass substrate. In another embodiment, the nanoparticles are collected into a downstream fluidic system.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus generally shown in FIG. 1 through FIG. 5. It will be appreciated that the apparatus may vary as to configuration and as to details of the parts, and that the method may vary as to the specific steps and sequence, without departing from the basic concepts as disclosed herein.

Figure 1A:
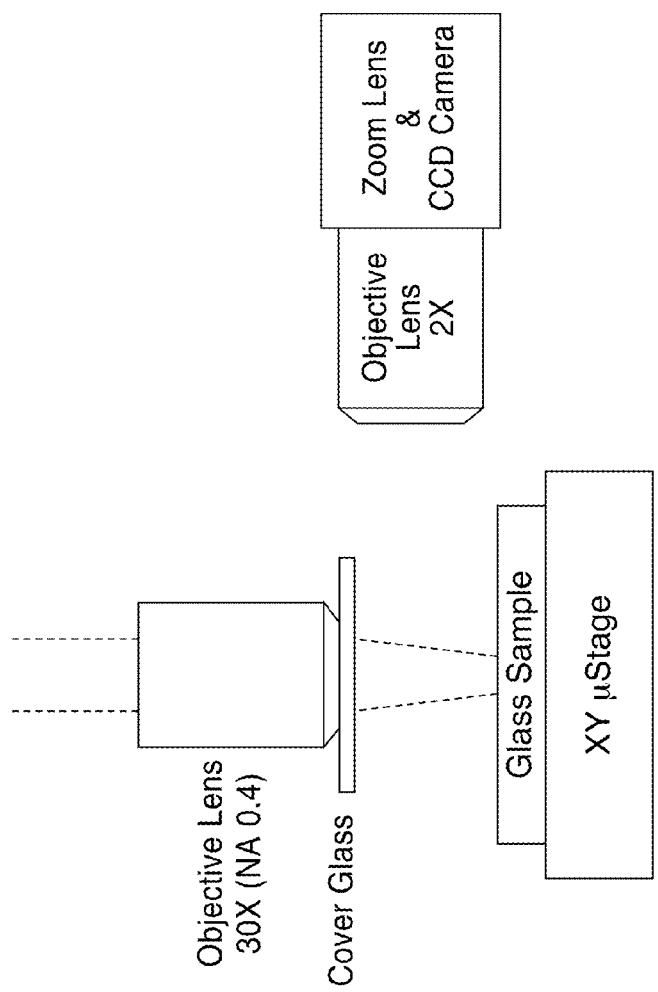
FIG. 1 shows the schematics of the nanoparticle generation and in-situ monitoring system (A), and a side-view image of particle generation by laser ablation (B).

By way of example, and not of limitation, erbium (Er) doped Bismuth (Bi) oxide glasses were prepared by melting mixed powders in a platinum crucible. The obtained glasses were cut and polished into optically smooth surfaces. A high repetition rate ultrashort pulsed-laser (IMRA America, FCPA µJewel, ~375 fs pulse width at 1045 nm wavelength, 5 MHz maximum repetition rate at ~100 nJ pulse energy) was chosen to generate nanoparticles by ablating the base glass material. In this example, the laser pulses at 1 MHz repetition rate and ~500 nJ pulse energy were focused on the sample top surface by a 30× objective lens (NA=0.4, working distance=3.5 mm). The relative position of the sample was accurately controlled by three-dimensional motorized micro-stage under ambient atmospheric conditions. In order to monitor the ablation process in-situ and adjust the exact laser focal spot on the sample, top reflection images were taken by the same objective lens coupled to a zoom lens and a CCD camera. Bright/dark field side-view imaging setup based on a 2× objective lens was also implemented to visualize the particle ejection motion. FIG. 1A presents a schematic diagram of the experimental setup for glass ablation. The ablated particles were collected on silicon and glass substrates in ambient air environment for Transmission Electron Microscope (TEM) and Scanning Electron Microscope (SEM) characterization.

Figure 1B:
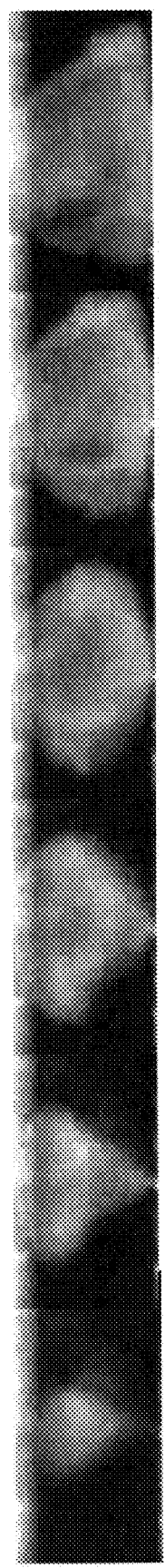

FIG. 1B shows a sequence of CCD photographs resulting from high repetition rate femtosecond laser ablation of Erbium doped Bismuth oxide glass under normal atmospheric conditions. Laser light was focused on the substrate from the top and through the glass substrate, which is implemented for protection of focusing optics from contamination by material ejecta. The ablation plume first reached the cover glass within approximately 6 ms. Following the collision with the cover glass surface, the plume continuously expanded downwards, forming a mushroom shaped plume trajectory at around 100 ms time scale. This trend is more prominent when the glass cover plate is removed. Eventually, the ablated material tends to move as a connected chain network structure. It has been reported that after the initial plume formation, colliding particles form aggregates that continue to grow by a cluster-cluster aggregation process, over almost the final stage of the cooling process.

The detailed mechanisms of nanoparticle generation by high repetition rate femtosecond laser pulses are still under investigation. Nevertheless, it is believed that thermal process is a dominant ablation mechanism. Note that, even though laser pulses used were femtosecond time duration, pulse-to-pulse accumulation effects should be considered with respect to carrier excitation, substrate heating and ablated plume interaction with subsequent laser pulses. Especially in low thermal conductivity glass materials, the MHz repetition rate pulse train induces a continuous component due to temperature accumulation effects. Further, femtosecond lasers were chosen mainly due to processing capability of various kinds of glass materials at visible or near infrared wavelengths via multi-photon absorption. When thermal mechanisms dominate the ablation process, particles are mainly generated either through condensation from the vapor phase or by direct ejection from superheated melt. Surface tension of the molten phase favors generation of spherical particles. In addition, the configuration of tight laser focusing allows laser focal volume much smaller than the ablation plume trajectory, greatly reducing interaction of the ablated plume with subsequent laser illumination. The aforementioned tight focusing scheme greatly contributes to the production of small and uniform sized nanoparticles, as verified through comparison experiments by orders of magnitude larger laser focal spot that generates larger sized particles by agglomeration and/or sintering within laser focal volume. While tight focusing facilitates controlled nanoparticle generation, production yield might be diminished. Proper implementation of multiple lens based focusing system is expected to solve the limitation.

Figure 2B:
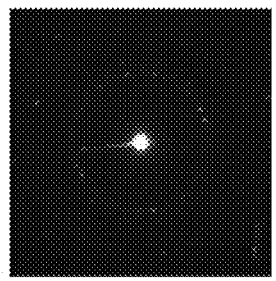
FIG. 2 shows transmission electron micrographs of nanoparticles (A, C), selected area electron diffraction pattern (B), and a histogram of the particle size distribution (D).
Figure 2A:
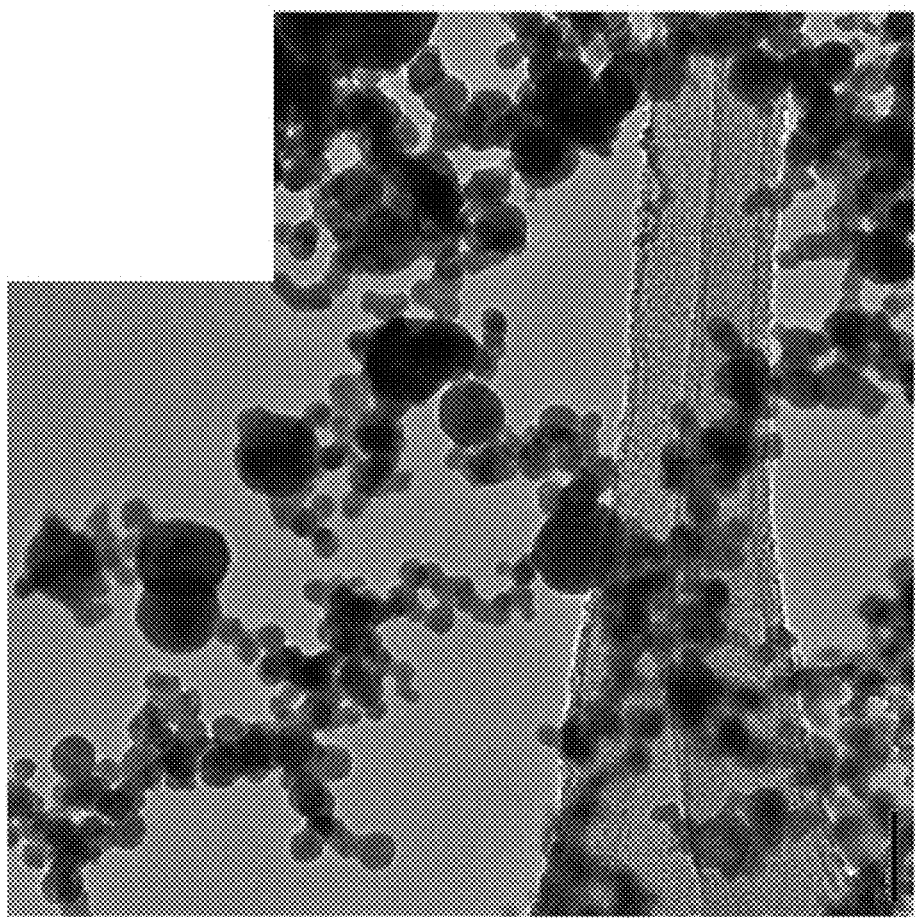
Figure 2D:
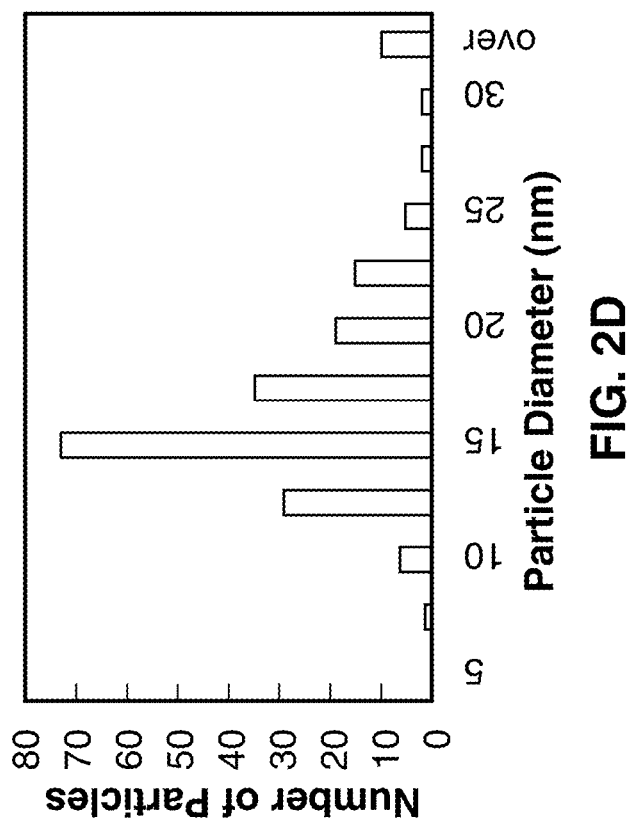
Figure 2C:
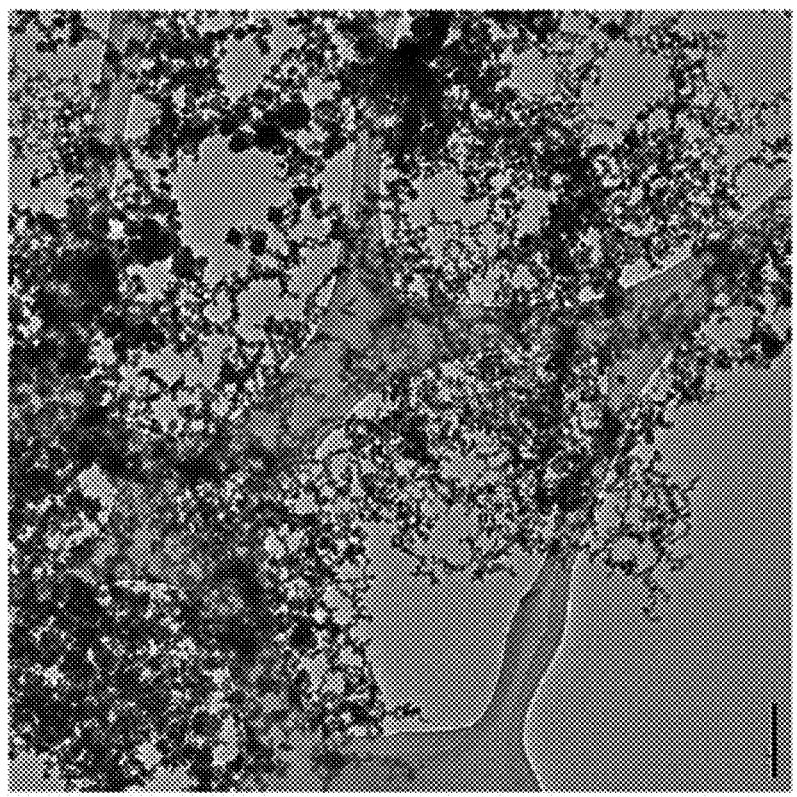
Figure 3B:
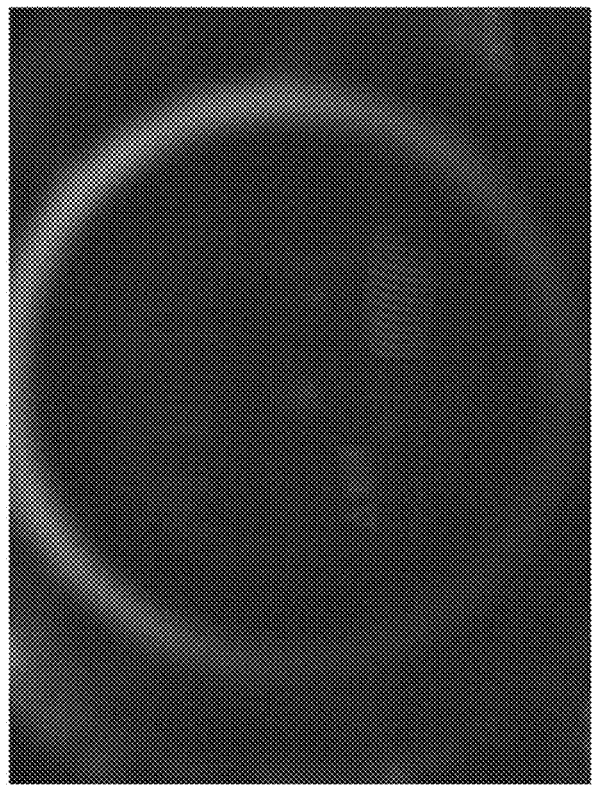
FIG. 3 shows upconversion emission viewed in a dark room through red and NIR blocking filter (A) with 800 nm pump laser, (B) without pump laser.
Figure 3A:
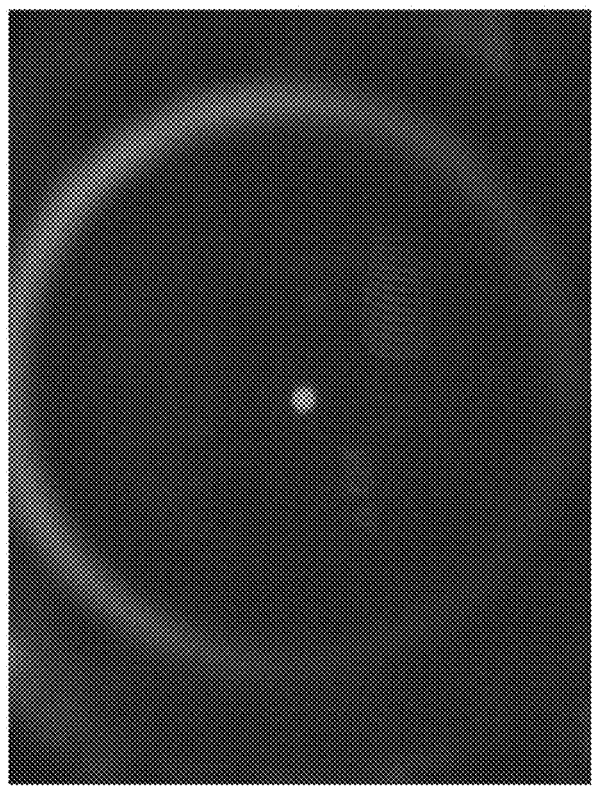

The transmission electron microscopy (TEM) images of the collected particles are shown in FIGS. 2A and 2C. These particles were collected at far enough distance from the ablated spot, e.g. after forming network structure, as explained above. Glass nanoparticles had highly spherical shape and formed one or two dimensional chain structures, as expected from the plume expansion observation. Single- or poly-crystallinity of the material is deduced from the selected area electron diffraction pattern data given in FIG. 2B. Based on analysis of 200 particles from an arbitrarily selected TEM micrograph region, the average particle size was found to be around 17 nm with a standard deviation of 6.8 nm. A histogram of the particle size distribution is given in FIG. 2D.

Figure 4A:
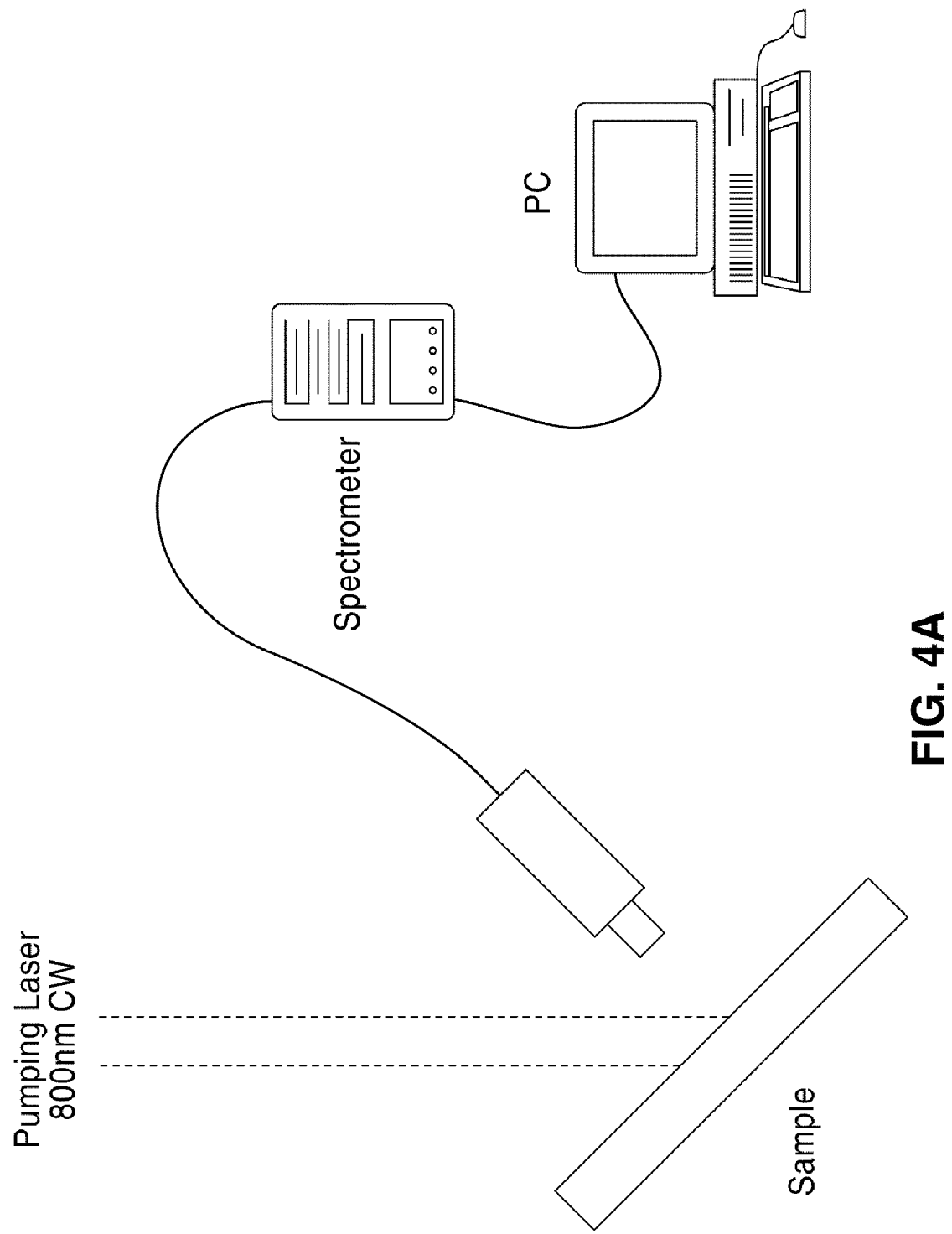
FIG. 4 shows schematics of the photoluminescence measurement setup (A); upconversion fluorescence spectra of the Er—Bi glass based nanoparticles and bulk glass substrate (B); and power dependence of the upconverted emission of nanoparticles and bulk glass substrate (C).
Figure 4B:
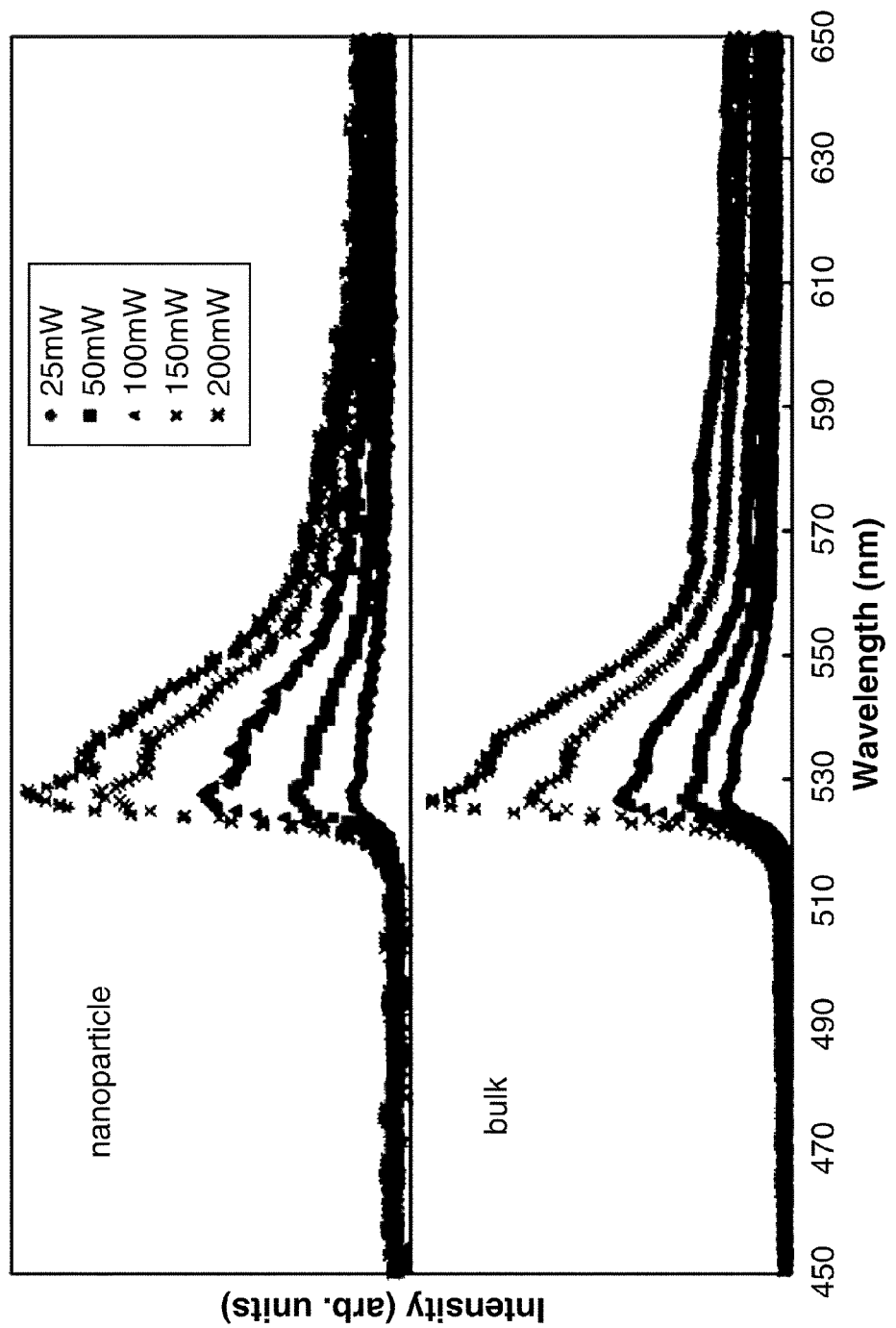
Figure 4C:
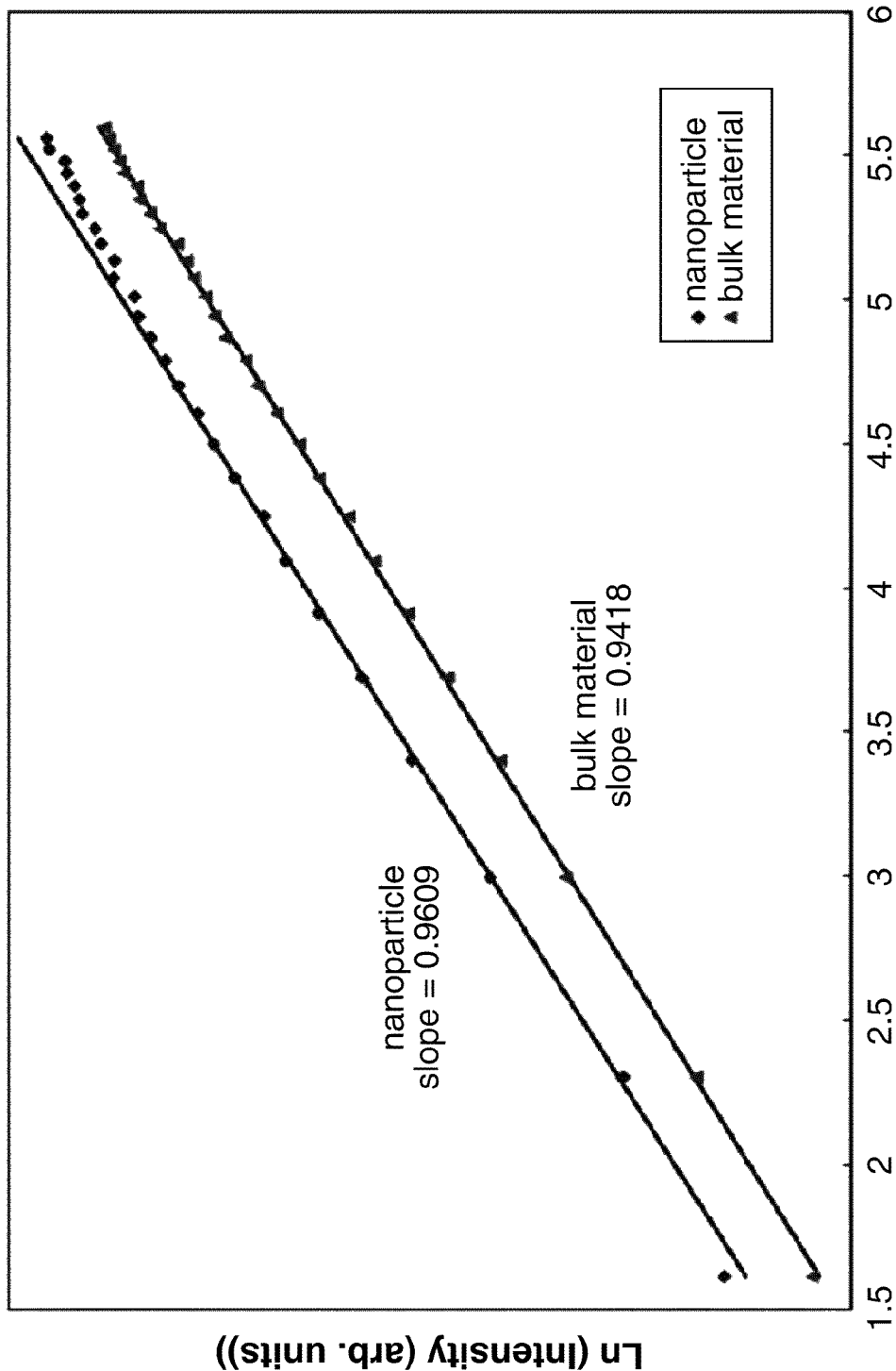

Photoluminescence characteristics of the nanoparticles have been investigated in order to verify their potential applications to bio imaging and light emitting devices. For this purpose, the nanoparticles were deposited on a fused silica substrate. Upconversion spectra of Er-doped Bismuth oxide glass nanoparticles were measured by a spectrometer system (Princeton Instruments) under 800 nm CW laser excitation (Ti:Sapphire, pumped by diode pumped solid state laser of 532 nm wavelength, Spectraphysics Inc.). The schematic of the experimental setup is shown in FIG. 4A. Furthermore, time-resolved emission measurement has been performed to explore upconversion lifetime characteristics in nanoparticles by green nanosecond laser pumping (Q-switched Nd:YAG, New Wave Research, 532 nm wavelength and ~4-6 ns pulse width).

Figure 5:
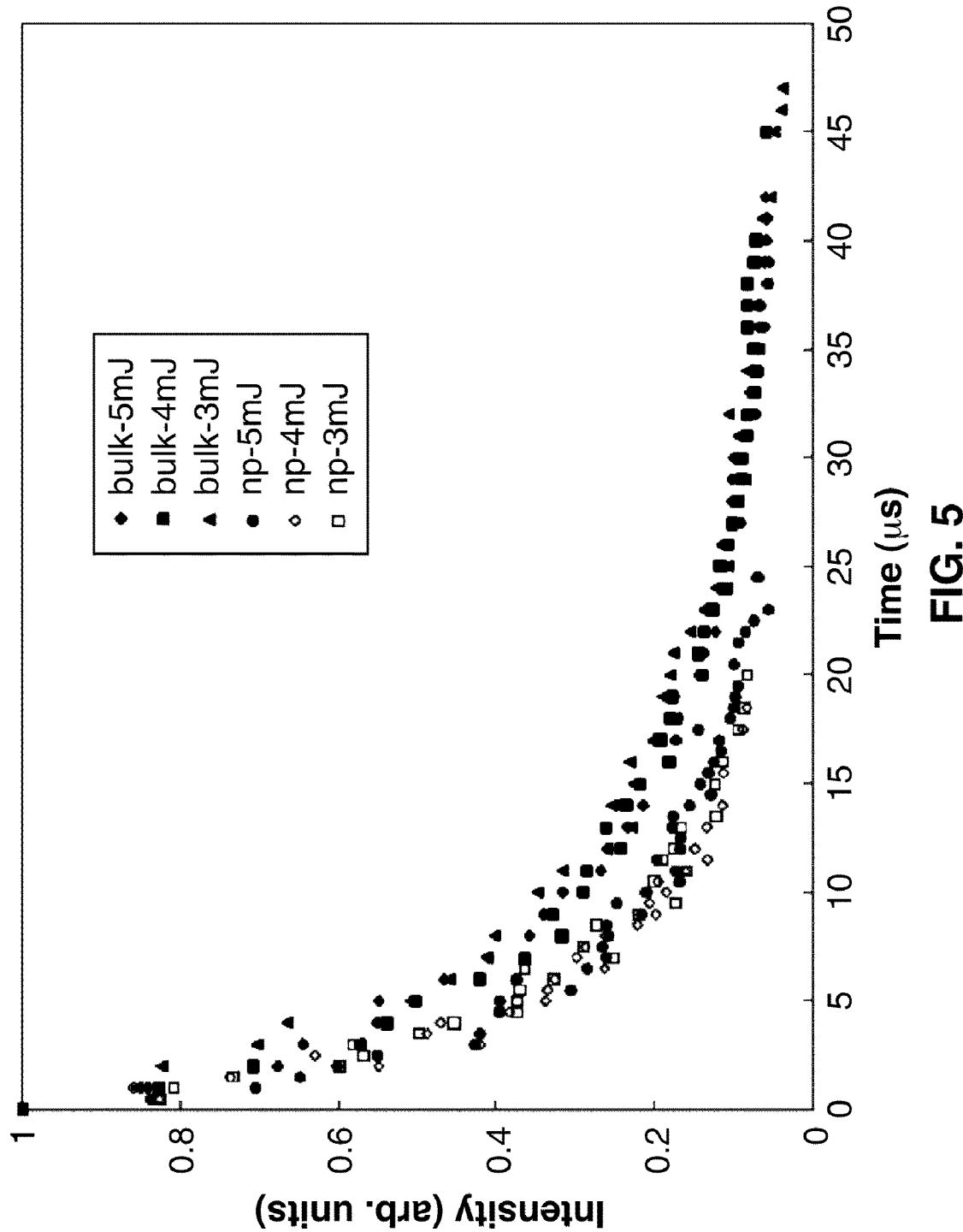
FIG. 5 shows upconversion emission lifetime of nanoparticles and bulk glass material, pumped with nanosecond YAG (SHG).

The upconversion spectra from glass nanoparticles under 800 nm laser excitation were measured at various pumping powers. During this experiment, intense green light emission from the nanoparticles was observed by naked eye through a red-IR blocking filter, as the photographs taken by digital camera demonstrate in FIGS. 3A and 3B. FIG. 4A reveals the similarity in the upconversion fluorescence spectra from nanoparticles and bulk material. The spectrum of these samples present unique $Er^{3+}$ upconversion emission bands. The green emissions between 510 and 530 nm and 530 and 570 nm are assigned to the $^2H_{11/2} \rightarrow {}^4I_{15/2}$ and $^4S_{3/2} \rightarrow {}^4I_{15/2}$ transitions, respectively. A clear emission peak at 526 nm was observed due to the $^2H_{11/2} \rightarrow {}^4I_{15/2}$ transition, while several different peaks (533, 537, 549) from $^4S_{3/2} \rightarrow {}^4I_{15/2}$ transition overlapped as the pumping power varied. For interpretation of short-wavelength luminescence, it is often assumed that the order n of the upconversion process, i.e., the number n of pump photons required to excite the emitting state, is indicated by the slope of the luminescence intensity versus pump power in double-logarithmic representation. Thus, to determine the number of photons responsible for the upconversion mechanism, we measured the intensities of the upconversion emission as a function of the 800 nm excitation intensity. The nanoparticle sample is shown to reach saturation point with lower pumping power in FIG. 3B, indicating a more efficient pumping process. The green upconversion emission slopes for nanoparticle and bulk sample were determined both slightly less than 1.0, indicating that the upconversion process is mostly as a result of cooperative upconversion and not energy-transfer upconversion (ETU). The base glass material used in this experiment does not have additional dopants that can cause ETU as it has been optimized for down conversion process for telecommunication amplifier. Therefore, by using Er and Yb co-doped glass material, stronger upconversion efficiency is reasonably expected. Measured upconversion emission lifetimes from nanoparticles and bulk glass material show similar trends, although the decay time is slightly reduced for nanoparticles (FIG. 5).

Figure 6:
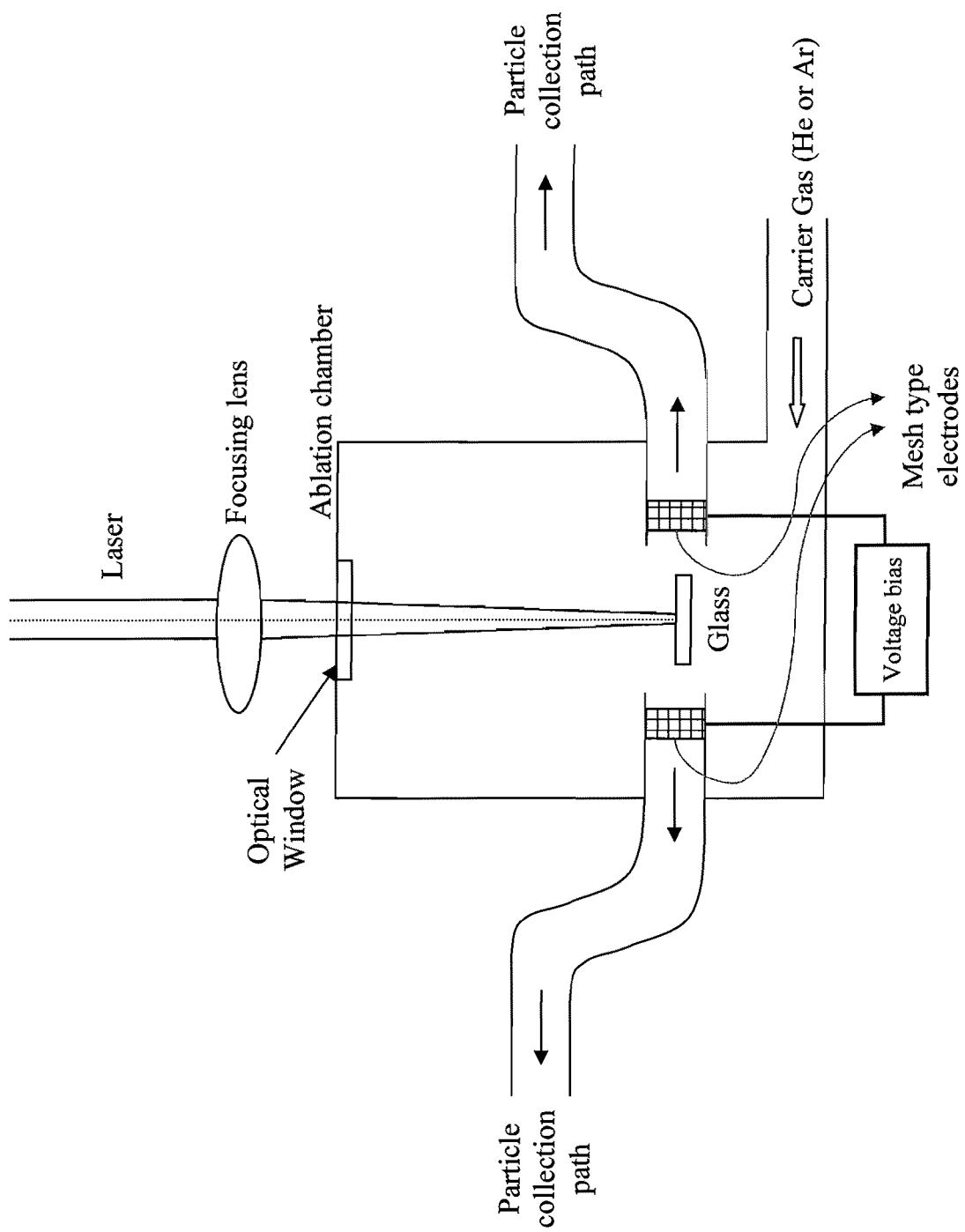
FIG. 6 shows an embodiment of the present invention in which the glass material is utilized in conjunction with a fluidic system for capturing the nanoparticles.

Another embodiment of the present invention, shown in FIG. 6, performs the ablation in a chamber, and collects the nanoparticles using fluidic paths proximate the glass material. The portion of each collection path that is nearest the glass material is fitted with an electrode, and the electrodes in the chamber are subjected to a bias. A carrier gas, such as helium or argon, flows through the system.

Many other active glass media can be utilized per the described invention. The ablation can occur in a liquid environment or in a gaseous atmosphere for protective coating to prevent agglomeration. Furthermore, application of electric fields can assist in efficiently guiding the ablated plume as has been demonstrated by the inventors. Application of electric fields not only would facilitate practical collection of the generated nanoparticles but also might affect the size and uniformity of the generated particles by actively controlling the interaction of the ablated plume with the laser beam, even with enlarged laser focal spot, thereby increasing production yield (refer to paragraph [0027]). Many Combinations of lasers or substrate heating can be used to increase the particle yield and control the size under optimal conditions. Many applications in bio-imaging and opto-electronics are envisioned.

The described results carry substantial promise, in that they demonstrate a direct and efficient method of transferring bulk glass characteristics into nanometric dimensions in ambient air environment. In summary, we have developed a method for generating ultra-fine upconversion glass nanoparticles by laser ablation in atmospheric environment. The produced single- or poly-crystalline nanoparticles had highly spherical shape of around 17 nm in average diameter with narrow size distribution and showed one or two dimensional chain structures. The nanoparticles exhibit similar photoluminescence properties to bulk glass material. The laser ablation method presented here is highly attractive because this technique may provide an efficient way to generate nanoparticles of any composition under ambient conditions. Glass based upconverting nano materials demonstrated in this study have great potential for a wide range of bio imaging and light emitting applications due to their thermal, chemical and mechanical stability as well as the non-toxicity. A remarkable advantage is that the bulk properties are transferred to the particles implying highly predictable and repeatable optical properties. These attributes make the active glass nanoparticles far superior than the currently used QDs.

Although the description above contains many details, these should not be construed as limiting the scope of the invention but as merely providing illustrations of some of the presently preferred embodiments of this invention. Additional laser processing routes, in combination with either dual or multiple laser sources (e.g. with a $CO_2$ laser) and further with other oxide nanoparticle schemes (e.g. torch) could be effectively utilized for the production of active glass nanoparticles. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method for producing active glass nanoparticles, comprising
    subjecting an active glass substrate material to a plurality of laser generated light pulses; and
    collecting nanoparticles ejected from said substrate material;
    wherein said nanoparticles exhibit upconversion luminescence.

2. A method for producing active glass nanoparticles as recited in claim 1, further comprising ablating said substrate material with said laser.

3. A method as recited in claim 1, wherein said substrate material is in a liquid environment.

4. A method as recited in claim 1, wherein said substrate material is in a gaseous environment.

5. A method as recited in claim 1, wherein said substrate material comprises an Erbium-doped material.

6. A method as recited in claim 1, wherein said substrate material comprises an Erbium-doped Bismuth Oxide material.

7. A method as recited in claim 1, wherein said substrate material comprises $Bi_2O_3$ based Er-doped glass material.

8. A method as recited in claim 1, wherein said laser comprises a high repetition-rate, ultra-short pulse duration laser.

9. A method as recited in claim 1, further comprising collecting said nanoparticles on a silicon or glass substrate.

10. A method as recited in claim 1, wherein said nanoparticles have a mean particle diameter of approximately 17 nm.

11. A method for producing active glass nanoparticles, comprising
    ablating an active glass substrate with light from a pulsed-laser; and
    collecting nanoparticles ejected from said substrate material;
    wherein said nanoparticles exhibit upconversion luminescence.

12. A method as recited in claim 11, wherein said substrate material is in a liquid environment.

13. A method as recited in claim 11, wherein said substrate material is in a gaseous environment.

14. A method as recited in claim 11, wherein said substrate material comprises an Erbium-doped material.

15. A method as recited in claim 11, wherein said substrate material comprises an Erbium-doped Bismuth Oxide material.

16. A method as recited in claim 11, wherein said substrate material comprises $Bi_2O_3$ based Er-doped glass material.

17. A method as recited in claim 11, wherein said laser comprises a high repetition-rate, ultra-short pulse duration laser.

18. A method as recited in claim 11, further comprising collecting said nanoparticles on a silicon or glass substrate.

19. A method as recited in claim 11, further comprising collecting said nanoparticles via a downstream fluidic conduit.

20. A method as recited in claim 11, wherein said nanoparticles have a mean particle diameter of approximately 17 nm.

21. A method for producing active glass nanoparticles, comprising
    ablating an active glass substrate with light from a high repetition-rate, ultra-short pulse duration laser; and
    collecting nanoparticles ejected from said substrate material;
    wherein said nanoparticles exhibit upconversion luminescence.

22. A method as recited in claim 21, wherein said substrate material is in a liquid environment.

23. A method as recited in claim 21, wherein said substrate material is in a gaseous environment.

24. A method as recited in claim 21, wherein said substrate material comprises an Erbium-doped material.

25. A method as recited in claim 21, wherein said substrate material comprises an Erbium-doped Bismuth Oxide material.

26. A method as recited in claim 21, wherein said substrate material comprises $Bi_2O_3$ based Er-doped glass material.

27. A method as recited in claim 21, further comprising collecting said nanoparticles on a silicon or glass substrate.

28. A method as recited in claim 21, further comprising collecting said nanoparticles via a downstream fluidic conduit.

29. A method as recited in claim 21, wherein said nanoparticles have a mean particle diameter of approximately 17 nm.

30. A method for producing active glass nanoparticles, comprising:
    ablating an active glass substrate with light from a pulsed-laser; and
    collecting nanoparticles ejected from said substrate material;
    wherein said nanoparticles are collected via a downstream fluidic conduit.

* * * * *